Figure 1:
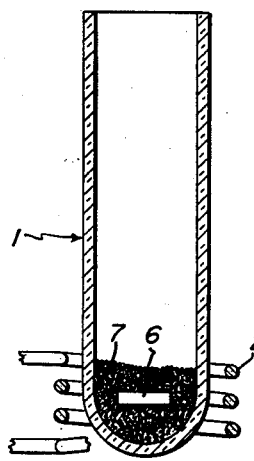

Aug. 25, 1964

M. AVEN 3,146,204

PREPARATION OF II-VI SEMICONDUCTING COMPOUNDS
BY SOLVENT EXTRACTION
Filed April 15, 1963

Inventor:
Manuel Aven,
by John F. Ahern
His Attorney.

United States Patent Office 3,146,204
Patented Aug. 25, 1964

3,146,204
PREPARATION OF II-VI SEMICONDUCTING COMPOUNDS BY SOLVENT EXTRACTION
Manuel Aven, Burnt Hills, N.Y., assignor to General Electric Company, a corporation of New York
Filed Apr. 15, 1963, Ser. No. 273,239
11 Claims. (Cl. 252—62.3)

This invention generally pertains to utilization of the technique of solvent extraction as a step in the synthesis of II-VI semiconducting compounds, and more particularly relates to the control of impurities in such semiconducting compounds. The present application is a continuation-in-part of my earlier application entitled "N-Type Conductivity Binary Compound Semiconductive Materials and the Preparation Thereof," Serial No. 173,560, filed February 15, 1962, now abandoned, and assigned to the assignee herein.

It is known that single crystals of the wide bandgap II-VI compounds, such as zinc telluride (ZnTe), zinc selenide (ZnSe), zinc sulphide (ZnS), and cadmium sulphide (CdS), can be prepared by either the melt growth or the vapor-phase growth techniques. In either case, the materials are in contact with refractory container materials for considerable lengths of time at high temperatures and are hence subject to contamination by diffusion of impurities from the container material into the crystal. Frequently even the most painstakingly purified starting materials do not lead to comparably pure single crystals. The floating zone purification technique used successfully with many semiconductor materials is, in principle, possible with II-VI compounds. However, because of the high vapor pressure of these compounds, and particularly ZnSe, ZnS and CdS, at their respective melting points, the required apparatus is often prohibitorily complex. As a result, the highly desirable wide bandgap II-VI compounds are only available with a high residual impurity concentration, in the order of one part per million.

It is well-known in the prior art that many semiconductor materials, for example, germanium and silicon, and binary semiconductive materials, for example, gallium arsenide and aluminum antimonide, can be rendered either P-type or N-type conductive by incorporation therein of extremely small amounts of "acceptor" or "donor" impurities, respectively. While cadmium telluride (CdTe) can be prepared in the foregoing manner in P-type or N-type conductivity with suitably low resistivity for utilization in semiconductor devices, none of the other II-VI compounds have heretofore been prepared, by any technique known to the prior art, in both of these desirable forms, except with extremely high resistivity in at least one of the two forms. The relative insensitivity of the II-VI compounds to the addition of controlled amounts of impurity is largely traceable to the high residual impurity concentration already in the material. The II-VI compounds are particularly susceptible to contamination by diffusion of acceptor type impurities such as silver (Ag) and copper (Cu). The concentration of these impurities has been found to be sufficiently high to substantially preclude control of conductivity type in many of the II-VI compounds. Furthermore, great difficulty has been experienced in the past in endeavoring to prepare N-type material by addition of the desirable "donor" impurities such as aluminum, gallium and indium. It is known that aluminum, for example, provides a particularly desirable "donor" impurity although its use has heretofore been limited in II-VI compounds because of the high temperature at which these compounds are formed and the rapidity with which aluminum oxidizes in the presence of the slightest trace of oxygen. It is desirable to provide some means for removal or reduction of residual impurities in the II-VI compounds and to enable controlled amounts of donor impurities, such as aluminum, to be incorporated therein.

Accordingly, it is an object of this invention to provide II-VI compounds having reduced residual impurity concentrations.

It is another object of this invention to provide a method for removal of acceptor type residual impurities from II-VI compounds.

It is a further object of this invention to provide a method for removing acceptor type impurities from II-VI compounds and simultaneously introducing therein donor type impurities.

Briefly, in accordance with the present invention, impurities are extracted from a selected II-VI compound by heating a crystal of the compound in an inert atmosphere and in contact with the liquid phase of the group II constituent. The temperature is in the order of 1000° C. and, preferably, the temperature is maintained for a time sufficient to establish equilibrium between the solid and liquid phases. Normally, from one to five days is sufficient, depending upon the particular compound. Thereafter, when it is desired to introduce a particular donor impurity, such as aluminum, into the crystal, further heating under similar conditions is effected with a quantity of the desired impurity being added to the molten group II constituent. Alternatively, the steps can be combined and only a single firing in the group II constituent and donor impurity utilized, although the extraction of acceptor impurities has been found to be somewhat less complete with one combined firing than with dual firings.

Figure 2:
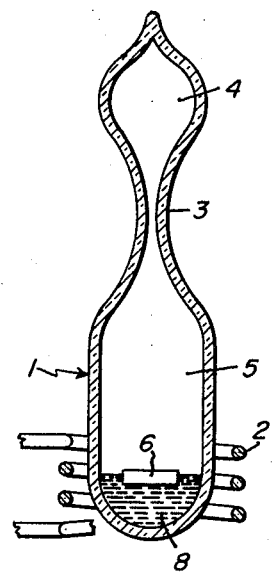

The features of my invention which I believe to be novel are set forth with particularity in the appended claims. My invention itself, however, both as to its organization and method of operation, together with further objects and advantages thereof, may best be understood by reference to the following description and specific examples taken in connection with the accompanying drawing, in which:

FIGURES 1 and 2 are diagrammatic illustrations of a simplified apparatus suitable for use in the practice of this invention.

A wide variety of apparatus will be found suitable for use in the practice of this invention as long as they provide for heating a body in an inert atmosphere and in contact with the liquid phase of one of the constituent elements thereof. Though the present invention is in no way dependent upon a specific apparatus, for purposes of more clearly understanding the process of this invention, a brief explanation of one apparatus and technique which I have used is described.

The apparatus shown diagrammatically in FIGURES 1 and 2 comprises a tube 1 constituted of inert refractory material, such as quartz. Means for applying heat to tube 1 may take a plurality of forms, including a radiant heating coil 2, as shown. The material of coil 2 may be any of a large number of refractory metals, such as tungsten or molybdenum, which may be heated by passing an electric current therethrough.

A crystal 6 of the II-VI compound to be treated is placed inside tube 1. A body of the group II constituent thereof, which may be in particulate form as body 7, is added and tube 1 is evacuated and sealed in well-known manner to provide the desired inert atmosphere. Alternatively, tube 1 may be filled with an inert gas, such as nitrogen or one of the noble gases, either at atmospheric pressure or below, to achieve the same result. As illustrated, particularly in FIGURE 2, tube 1 may be provided with a constricted region 3, to facilitate the convenient separation of molten material and the crystal after the heating period.

Tube 1 is heated in accordance with my invention to a temperature whereat the group II body 7 (and any added donor type impurities) enter the liquid phase. The temperature is regulated so that the semiconductive material of crystal 6 remains in the solid phase. At the termination of the heating period, separation of the molten material is achieved by quickly inverting and "snapping" tube 1 in a manner similar to that employed with a conventional fever thermometer, for example. In this way the molten material 8 is transferred through the constricted region 3 to the upper portion 4 of tube 1, while the solid crystal 6 remains in the portion 5 thereof. The tube is then broken and crystal 6 extracted. This technique was utilized throughout in the practice of my invention, and for purposes of clarity and simplicity of explanation in the following specific examples, repetitiousness and redundancy will be avoided by avoiding further reference to this technique.

The process of this invention has been utilized to prepare low resistivity N-type conductivity in ZnS and ZnSe, having reduced acceptor type residual impurity. This is achieved by placing an unactivated (i.e., "undoped") ZnS or ZnSe crystal in contact with zinc metal in the liquid phase. It has been found that at temperatures below about 600° C. a very long time is required to detect an increase in N-type conductivity in the crystal, while at temperatures of about 1200° C. the body itself begins to dissolve. Preferably, therefore, the body is heated in contact with molten zinc and in an inert atmosphere to a temperature in the range of about 700° C. to 1100° C. Because of the kinetic aspects of the process, N-type conductivity is established in the body of ZnS or ZnSe in a much shorter time at the higher temperatures. The time of heating, therefore, depends upon the temperature employed. For economic reasons, a temperature of 1100° C. is to be greatly preferred in a commercial process. Heating for a longer period than the minimum required to establish the desired N-type conductivity in the body is not harmful. For example, a decrease in acceptor type residual impurity in ZnSe semiconductive material was produced in accordance with this invention when a body thereof was heated to a temperature of about 1000° C. for as little as about 24 minutes. Conversely, longer firing times have not been found to adversely affect the properties of the crystals, and material of consistently low resistivity has been prepared by firing times extending to 64 hours. At temperatures in the preferred range, bodies weighing in the order of 0.2 gram and of consistently good low resistivity N-type conductivity ZnS and ZnSe have been prepared by heating such bodies for periods in the range of about 1 to 16 hours. Since large bodies require longer heating periods to establish N-type conductivity throughout, the heating period is essentially determined by the time needed to achieve such N-type conductivity. Thus, the body should be heated in an inert atmosphere and in contact with the molten metal for a time sufficient to establish the desired N-type conductivity.

ZnSe may be prepared, in accordance with this invention, in N-type conductivity with a room temperature resistivity as low as about .1 ohm centimeter. ZnS may be similarly prepared with N-type dark conductivity and resistivity of about 100 ohm centimeters at about 150° C. Other outstanding achievements include preparation of ZnTe (P-type) with a resistivity at 80° K. of only 20 ohms centimeters, CdS with the highest mobility reported and ZnSe with aluminum impurity having sufficient carrier concentration ($2 \times 10^{18}$ per cubic centimeter) to be degenerate.

The following specific examples of the practice of the present invention are given by way of illustration only and are not to be construed in a limiting sense. The first examples illustrate the purification of II–VI compounds achieved by the solvent extraction process of this invention, and the later example illustrates the effectiveness with which impurities may be diffused into II–VI semiconducting compounds by utilizing the process of this invention.

*Example I*

An unactivated ("undoped") single crystal of ZnS having a resistivity at 160° C. in excess of $10^{10}$ ohm centimeters and weighing approximately 0.2 gram was placed into a quartz tube with approximately 0.5 gram of high purity zinc pellets. The tube was evacuated, sealed, and heated to approximately 1000° C. for 64 hours. The resistivity of the zinc sulfide crystal at 160° C. was then found to be $10^2$ ohm centimeters, the electron mobility 70 square centimeters per volt second and the free carrier concentration approximately $10^{15}$ per cubic centimeter. The sign of the charge carriers was negative, as determined by Hall measurement, indicating that the prepared material was of N-type conductivity having a great reduction in acceptor type impurity concentration.

*Example II*

An undoped single crystal of ZnSe having a room temperature resistivity in excess of $10^{10}$ ohm centimeters, and weighing approximately 0.15 gram was placed into a quartz tube with approximately 0.3 gram of high purity zinc pellets. The tube was evacuated, sealed and heated to approximately 1000° C. for 16 hours. The resulting ZnSe crystal was found to have a room temperature resistivity of approximately 1 ohm centimeter, and electron mobility of about 465 square centimeters per volt second and a free carrier concentration of $16^{16}$ per cubic centimeter. The sign of the charge carrier was negative indicating that the material was of N-type conductivity having a great reduction in acceptor type impurity concentration.

*Example III*

In order to compare the effectiveness of the liquid phase preparation of this invention with the vapor phase preparation of the prior art, a pair of unactivated ZnSe crystals having a room temperature resistivity in excess of $10^{10}$ ohm centimeters, and each weighing approximately 0.1 gram, were placed into separate quartz tubes together with approximately 0.25 gram of high purity zinc pellets. The ZnSe crystal prepared in accordance with this invention was in contact with the liquid phase of the zinc metal at 1000° C. for 24 minutes and showed a room temperature resistivity of approximately 20 megohms as determined by 1 square millimeter probes spaced about 2 millimeters apart. The other sample was heated 1000 times longer (400 hours) at 1000° C. but the tube was maintained in such a position that contact between the crystal and molten zinc was prevented, although zinc vapor was present. A similar room temperature resistivity reading showed that the crystal prepared in accordance with the prior art had a resistivity of 5000 megohms, demonstrating that the mere suppression of the zinc vacancy acceptor concentration by the zinc vapor firing was insufficient to produce good N-type conductivity in ZnSe.

*Example IV*

In order to further confirm that the observed results of this invention were caused primarily by reduced impurity concentration rather than by reduction of the cation vacancy acceptor concentration, ZnTe ZnSe and CdS was monitored by a radioactive tracer technique using the isotopes $Cu^{64}$ and $Ag^{110}$. These isotopes of the noble metals were first diffused into the bulk of the crystal, then the crystal was chemically etched to remove any surface excess of the impurity, and the total gamma radiation was counted. The total Cu or Ag concentration was between $10^{17}$ and $10^{19}$ per cubic centimeter. The crystals were then purified in accordance with the present invention. The extraction was carried out by heating the crystals in the presence of five times their weight in the liquid phase of their constituent group II element. For ZnTe, a temperature of 950° C. and a firing time of 24 hours was found sufficient to establish equilibrium. For ZnSe the extraction occurred best at 1050° C. and took 36 hours. For CdS, a temperature of 850° C. for 48 hours produced equilibrium. The preceding times are for crystals with minimum dimensions of approximately 2 mm. In all cases the molten metal dissolved less than 5 percent of the crystal.

The results were monitored by a second gamma count and by considering the relative weights of the crystal and solvent metal. The segregation coefficients (ratio of the volume concentration of the impurity in the solid phase to that in the liquid phase) for Ag in ZnTe is $3 \times 10^{-3}$, for Ag in ZnSe is $2 \times 10^{-3}$, and for Ag in CdS is somewhat less than $2 \times 10^{-3}$. The segregation coefficient for Cu in ZnTe is $2 \times 10^{-3}$. This represents a residual concentration of the noble metals, Cu and Ag, in ZnTe of approximately $10^{14}$ per cubic centimeter.

*Example V*

A ZnTe crystal having a resistivity at 80° K. of $10^5$ ohm centimeters was found, after the liquid zinc firing, as in Example IV, to have a resistivity at 80° K. of 20 ohm centimeters. The room temperature mobility was 100 cm.$^2$ per volt sec. and the carrier concentration was $10^{14}$ per cm.$^3$. The sign of the charge carriers was positive indicating P-type material.

*Example VI*

An unactivated cadmium sulphide crystal was fired in cadmium at 800° C. for 110 hours and manifested an electron Hall mobility maximum of 11,000 centimeters$^2$ v.$^{-1}$ second$^{-1}$ at 37° K. This is the highest mobility reported for cadmium sulphide and indicates a very low acceptor concentration. The room temperature carrier concentration was $2.6 \times 10^{15}$ centimeters$^{-3}$.

*Example VII*

Extraction of the noble metal impurities from a crystal of cadmium selenide (CdSe) weighing 0.2 gram is accomplished in accordance with the present invention by firing the crystal in 1.0 gram of liquid cadmium at a temperature of 800° C. for 24 hours.

*Example VIII*

Extraction of the noble metal impurities from a crystal of cadmium telluride (CdTe) weighing 0.2 gram is accomplished in accordance with the present invention by firing the crystal in 1.0 gram of liquid cadmium at a temperature of 700° C. for 48 hours.

*Example IX*

The process of this invention may be utilized to perform the difficult task of introducing aluminum impurity into II–VI semiconductive material crystals. A ZnSe crystal, prepared as in Example II was further fired in an inert atmosphere in a molten alloy containing 90 atom percent Zn and 10 atom percent Al. The firing was carried out at 1,050° C. for 100 hours. The resulting zinc selenide crystal exhibited a room temperature mobility of 200 centimeters$^2$ per volt second and a carried concentration of $2 \times 10^{18}$ per centimeter$^3$, resulting in the lowest resistivity reported for this compound, namely 0.015 ohm centimeter. The carrier concentration in this crystal is sufficient such that the crystal exhibits degenerate properties. The sign of the charge carriers was negative indicating that the material was of N-type conductivity.

While the solvent extraction purification process of this invention has been described with respect to specific II–VI compounds and in preferred embodiments thereof, many changes and modifications will occur to those skilled in the art. For example, while the noble metals copper and silver have been referred to specifically the term noble metal as used herein and in the claims is intended to include gold. Similarly, while the difficult task of adding the donor impurity aluminum to ZnSe has been selected as a specific example, this feature of the present invention extends equally well to other impurities, such as indium and gallium, and to the other II–VI compounds. It is, therefore, to be understood that the appended claims are intended to include all such modifications and changes as fall within the true spirit and scope of the invention.

What I claim as new and desire to secure by Letters Patent of the United States is:

1. The process of purifying a II–VI compound semiconductive material constituted of one element selected from the group consisting of zinc and cadmium and one element selected from the group consisting of selenium, sulfur and tellurium, which process comprises: heating a solid body of said material in an inert atmosphere in contact with the liquid phase of its group II constituent.

2. The method of extracting residual impurities from a II–VI compound semiconductive material constituted of one element selected from the group consisting of zinc and cadmium and one element selected from the group consisting of selenium, sulfur and tellurium, which method comprises: placing a body of said compound semiconductive material and a body of the group II constituent thereof in an inert atmosphere; heating said bodies to a temperature, in the range of 700° C. to 1200° C., at which said group II constituent is in the liquid phase and said compound semiconductive material is in the solid phase so that said semiconductive material is in contact with the liquid phase of its group II constituent; and, maintaining said temperature for sufficient time to effect substantial extraction of said impurities.

3. The method of claim 2 wherein said impurities are noble metals.

4. The method of claim 3 wherein said semiconductive material is zinc selenide and said temperature is 1050° C.

5. The method of claim 3 wherein said material is zinc sulphide and said temperature is 1000° C.

6. The method of claim 3 wherein said material is zinc telluride and said temperature is 950° C.

7. The method of claim 3 wherein said material is cadmium selenide and said temperature is 800° C.

8. The method of claim 3 wherein said material is cadmium sulphide and said temperature is 850° C.

9. The method of claim 3 wherein said material is cadmium telluride and said temperature is 700° C.

10. The method of extracting noble metal residual impurities from a II–VI compound semiconductive material and introducing a donor impurity therein, said compound semiconductive material being constituted of one element selected from the group consisting of zinc and cadmium and one element selected from the group consisting of selenium, sulfur and tellurium, which method comprises: placing a body of said compound semiconductive material, a body of the group II constituent thereof and a body of said donor impurity in an inert atmosphere; heating said bodies to a temperature, in the range of 700° C. to 1200° C., at which said group II constituent and donor impurity are in the liquid phase and said compound semiconductive material is in the solid phase so that said semiconductive material is in contact with the liquid phase of said group II constituent and said donor impurity; and, maintaining said temperature for sufficient time to effect substantial extraction of said noble metal residual impurities and introduction of said donor impurity.

11. The method of claim 10 wherein said semiconductive material is zinc selenide and said donor impurity is aluminum.

References Cited in the file of this patent

UNITED STATES PATENTS 3,033,791    De Nobel et al.   _____ May 8, 1962

OTHER REFERENCES

Coblenz: "Semiconductor Compounds," Electronics, Nov. 1, 1957, pp. 144–149.